(12) United States Patent
Sasaki et al.

(10) Patent No.: US 7,077,161 B2
(45) Date of Patent: Jul. 18, 2006

(54) EXCESS PRESSURE RELIEF SYSTEM FOR TANK

(75) Inventors: Michiaki Sasaki, Hadano (JP); Takayuki Fuwa, Tokyo-to (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 25 days.

(21) Appl. No.: 10/502,301

(22) PCT Filed: Sep. 9, 2003

(86) PCT No.: PCT/JP03/11491

§ 371 (c)(1),
(2), (4) Date: Jul. 22, 2004

(87) PCT Pub. No.: WO2004/033944

PCT Pub. Date: Apr. 22, 2004

(65) Prior Publication Data

US 2005/0039799 A1  Feb. 24, 2005

(30) Foreign Application Priority Data

Oct. 10, 2002  (JP) .............................. 2002-297212

(51) Int. Cl.
*E03B 1/00* (2006.01)
(52) U.S. Cl. ...................................... 137/613; 251/118

(58) Field of Classification Search ................ 251/118, 251/119, 120, 121, 122, 123, 124, 125, 126, 251/127, 144; 137/613
See application file for complete search history.

(56) References Cited

U.S. PATENT DOCUMENTS

| 3,463,189 A | * | 8/1969 | Fitzpatrick ................ 137/614.2 |
| 3,770,014 A | * | 11/1973 | Limberg ................... 137/614.2 |
| 4,762,146 A | | 8/1988 | Ewbank et al. |
| 5,584,321 A | * | 12/1996 | Hargreaves et al. ......... 137/613 |
| 5,762,091 A | | 6/1998 | Sarné et al. |
| 5,870,896 A | * | 2/1999 | Clark et al. .................... 60/670 |

FOREIGN PATENT DOCUMENTS

| DE | 35 35 009 A1 | 4/1987 |
| FR | 1.006.564 A | 4/1952 |
| GB | 2 262 328 A | 6/1993 |
| JP | 7-195948 | 8/1995 |

* cited by examiner

*Primary Examiner*—Edward K. Look
*Assistant Examiner*—John K. Fristoe, Jr.
(74) *Attorney, Agent, or Firm*—McDermott Will & Emery LLP

(57) ABSTRACT

An excess pressure relief system for a tank (10) carried on a vehicle, which includes a relief valve (11) for relieving excess pressure in the tank (10); and a diffuser (12) provided on a discharge line (11a) downstream of the relief valve (11).

8 Claims, 7 Drawing Sheets

EXCESS PRESSURE RELIEF SYSTEM FOR TANK

TECHNICAL FIELD

The present invention relates to a pressure relief system for relieving excess pressure in a gas fuel tank, a hydrogen tank or the like by use of a relief valve.

BACKGROUND ART

A gas fuel tank mounted on a gas fuel vehicle is filled with liquefied petroleum gas (LPG) or compressed natural gas (CNG). A hydrogen tank mounted on a fuel cell vehicle is filled with liquefied hydrogen or high-pressure hydrogen gas.

Japanese Patent Application Laid-Open No. H7-195948 (published in 1995) discloses a structure for relieving excess pressure in a gas fuel tank by discharging gas from the gas fuel lank together with vaporized fuel to the outside by use of a relief valve when an internal pressure in the gas fuel tank is increased.

DISCLOSURE OF INVENTION

In the structure described above, when the relief valve opens to relieve excess pressure in the gas fuel tank, the high pressure as therein jets out of the relief valve together with the vaporized fuel, impinges on parts or equipment located in close front of an outlet of the relief valve in a jet direction, and affects the parts or equipment, causing accelerated deterioration thereof.

The present invention was made in the light of the above problems. An object of the present invention is to provide an excess pressure relief system for a tank carried on a vehicle, such as a gas fuel tank, a hydrogen tank or the like, which diffuses and attenuates a gas flow jetted out of a relief valve in order to prevent the gas flow from affecting parts or equipment in the vicinity of the relief valve.

An aspect of the present invention is an excess pressure relief system for a tank carried on a vehicle, comprising: a relief valve for relieving excess pressure in the tank; and a diffuser provided on a discharge line downstream of the relief valve.

BRIEF DESCRIPTION OF DRAWINGS

The invention will now be described with reference to the accompanying drawings wherein.

BEST MODE FOR CARRYING OUT THE INVENTION

Embodiments of the present invention will be explained below with reference to the drawings, wherein like members are designated by like reference characters.

Figure 1:
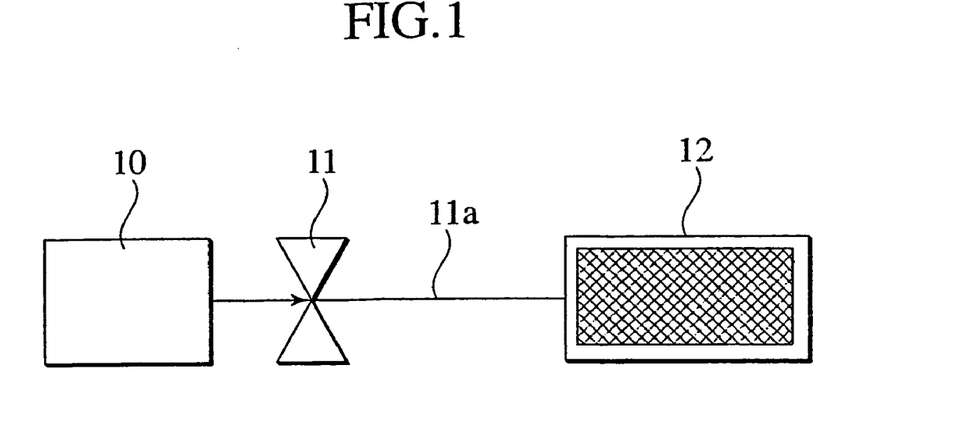
FIG. 1 is a schematic of an excess pressure relief system according to a first embodiment of the present invention.

As shown in FIG. 1, an excess pressure relief system of a first embodiment includes a fuel tank 10, a relief valve 11 and a gas diffuser 12. The fuel tank 10 is filled with gas fuel such as LPG or CNG in a gas fuel vehicle, or with liquefied hydrogen or high-pressure hydrogen gas in a fuel cell vehicle. The relief valve 11 is provided on the fuel tank 10 to relieve excess pressure in the tank 10. The gas diffuser 12 is provided on a discharge line 11a downstream of the relief valve 11, to diffuse and attenuate the discharged gas flow.

Figure 2:
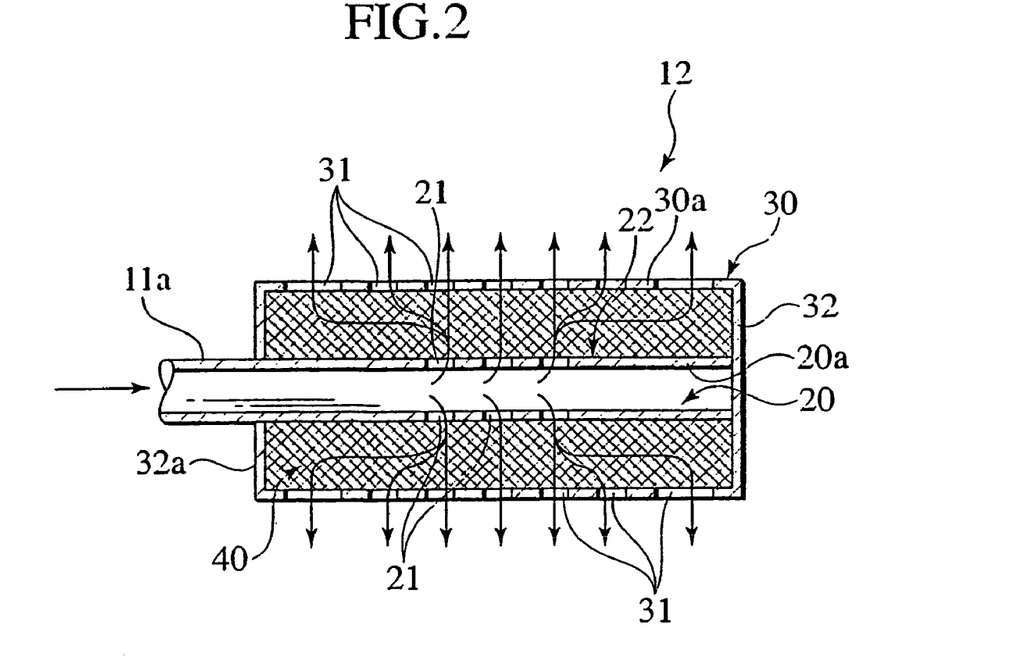
FIG. 2 is an enlarged sectional view of a gas diffuser for use in the excess pressure relief system of FIG. 1.

As shown in FIG. 2, the gas diffuser 12 includes an inner tube 20 connected to the end of the discharge line 11a, an outer tube 30 provided coaxially with and radially outside the inner tube 20 leaving a columnar space therebetween, and an intermediate diffuser member 40, arranged in the space between the inner tube 20 and the outer tube 30, for diffusing and moderating the discharged gas flow. The inner tube 20 is formed to have a large number of through holes 21 on its circumferential side face 20a. The outer tube 30 is formed to be longer in an axial direction thereof than a part 22 of the inner tube 20 formed with the through holes 21. The outer tube 30 extends further toward distal and base ends thereof than the through hole part 22 in the axial direction thereof. A large number of discharge holes 31 are formed all over an outer circumferential surface 30a of the outer tube 30 from a base end thereof to a distal end thereof. The discharge holes 31 are formed larger in diameter in the vicinities of the base and distal ends than in the axially mid portion of the outer tube 30.

At the distal ends of the inner and outer tubes 20 and 30, an end plate 32 is provided to close the openings thereof, and on the base end thereof, another end plate 32a is provided to close an opening of the outer tube 30, so that the gas discharged from the relief valve 11 flows out of the through holes 21 of the inner tube 20 into the intermediate member 40, passes through the intermediate member 40 and flows out of the discharge holes 31 of the outer tube 30 to the outside.

The intermediate member 40 is made of a material which allows the gas flow flowed out of the through holes 21 to pass therethrough and absorbs kinetic energy of the gas flow.

As described above, in this excess pressure relief system for a fuel tank of the first embodiment, the gas diffuser 12 is provided on the discharge line 11a downstream the relief valve 11. Therefore, when the gas in the fuel tank 10 is discharged together with the vaporized fuel from the relief valve 11, the discharged gas flow is diffused by the gas diffuser 12, whereby the gas flow is attenuated to have the pressure and kinetic energy thereof reduced. It is thus eliminated that the discharged gas impinges on parts or equipment (not shown) located close in front of an outlet of the relief valve 11 in a jet direction, thus suppressing influence on the parts or equipment.

The configuration of the gas diffuser 12 forces the discharged gas to flow out of the through holes 21 of the inner tube 20 thereof, pass through the intermediate member 40, and be discharged to the outside from the discharge holes 31 of the outer tube 30, thus, effectively reducing the pressure and kinetic energy of the discharged gas flow, and providing enhanced attenuation efficiency of the gas flow.

FIGS. 3A to 3C, 4A to 4C and 5A to 5C show first to third modification examples of the gas diffuser of the first embodiment, respectively. The same members therein as those of the first embodiment are designated by the same reference characters, and explanations thereof are omitted.

Figure 3A:
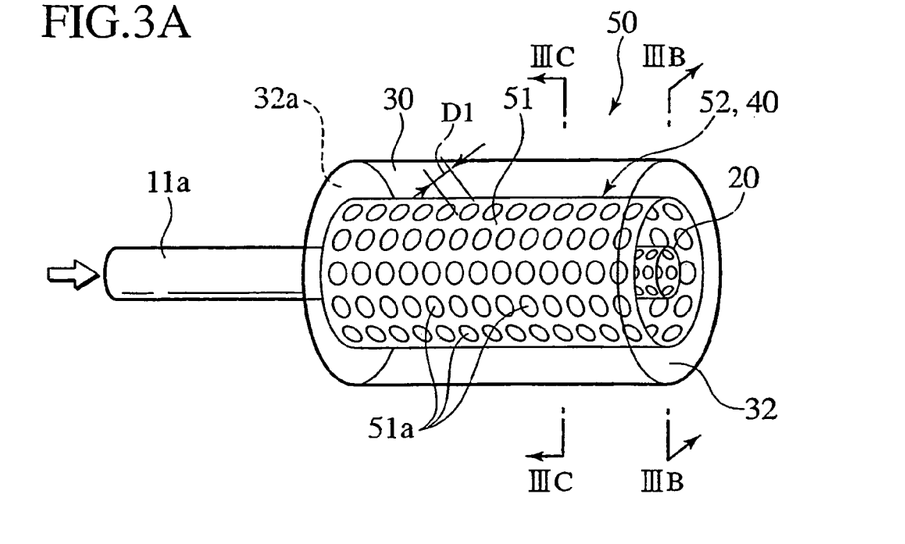
FIG. 3A is a perspective view of a first modification example of the gas diffuser for use in the excess pressure relief system of FIG. 1, from which an outer tube is omitted for clarity.
Figure 3B:
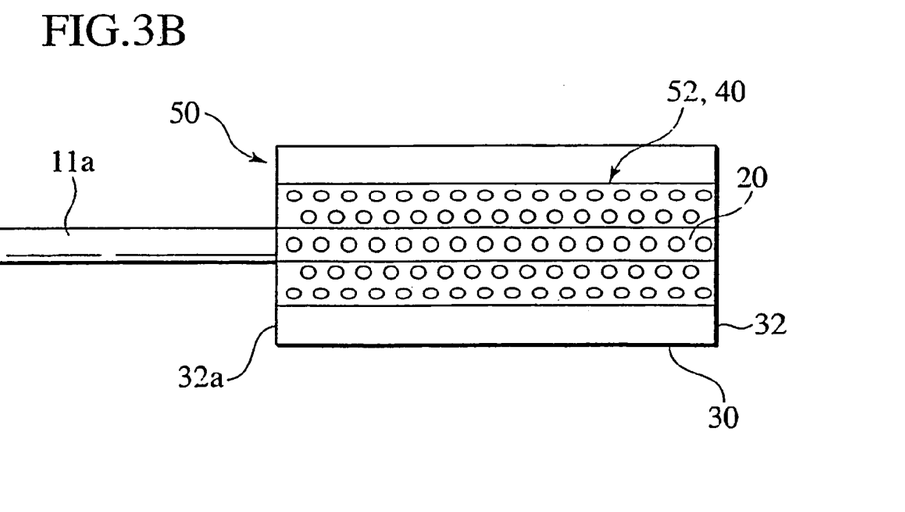
FIG. 3B is a longitudinal-sectional view of the gas diffuser of FIG. 3A, taken along a line IIIB—IIIB.
Figure 3C:
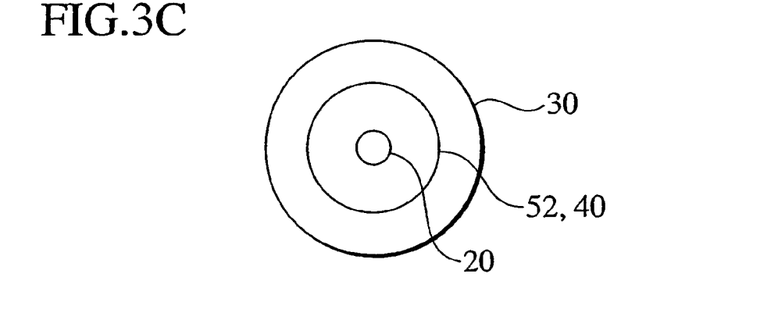
FIG. 3C is a cross-sectional view of the gas diffuser of FIG. 3A, taken along a line IIIC—IIIC.

As shown in FIGS. 3A to 3C, in a gas diffuser 50 according to the first modification example, the intermediate member 40 is essentially composed of a perforated tubular member 52 arranged in the space between the inner and outer tubes 20 and 30 coaxially therewith. The perforated tubular member 52 is made of a perforated stainless steel plate 51 over which a large number of through holes 51a are formed. Each through hole 51a is set to have a diameter D1 of a size suitable for diffusing/moderating the discharged gas flow from the inner tube 20.

Also in the first modification example, the inner tube 20 is formed to have a large number of the through holes 21 on the side face 20a thereof, and the outer tube 30 is formed to have a large number of the discharge holes 31 on the outer circumferential surface 30a thereof, respectively, and the end plates 32 and 32a are provided to close the openings at the both ends of the outer tube 30 in the axial direction, as in the first embodiment previously described.

In this gas diffuser 50, since the intermediate member 40 is essentially composed of the perforated tubular member 52, resistance to the discharged gas passing through the gas diffuser 50 can be adjusted by changing the diameters D1 of the through holes 51a on the perforated plate 51 and the number thereof. Moreover, since the perforated plate 51 of the perforated tubular member 52 is made of a stainless steel plate, which has excellent heat resistance and corrosion resistance, durability of the perforated tubular member 52 is improved.

Figure 4A:
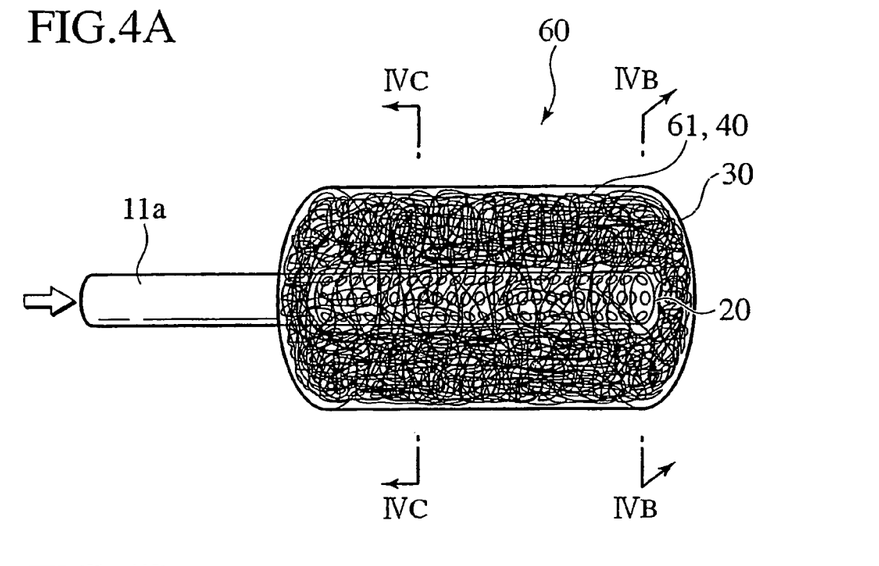
FIG. 4A is a perspective view of a second modification example of the gas diffuser for use in the excess pressure relief system of FIG. 1, from which an outer tube is omitted for clarity.
Figure 4B:
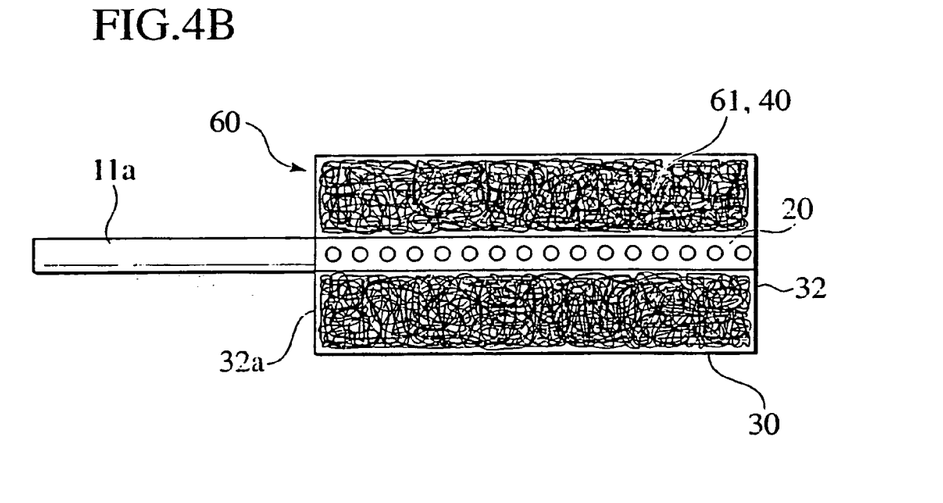
FIG. 4B is a longitudinal-sectional view of the gas diffuser of FIG. 4A, taken along a line IVB—IVB.
Figure 4C:
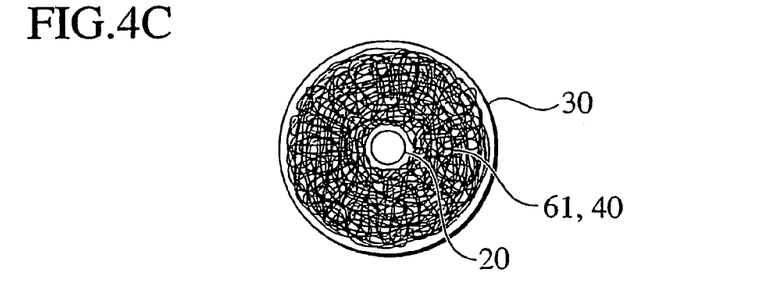
FIG. 4C is a cross-sectional view of the gas diffuser of FIG. 4A, taken along a line IVC—IVC.

In a gas diffuser 60 according to the second modification example, as shown in FIGS. 4A to 4C, the intermediate member 40 is essentially composed of metal wool 61 which is a mass of unwoven fine stainless steel threads, like a metal scourer.

The metal wool 61 is arranged to fill the space between the inner and outer tubes 20 and 30. Gas discharged from the through holes 21 of the inner tube 20 passes through the metal wool 61, and is discharged to the outside from the discharge holes 31 of the outer tube 30.

Also in the second modification example, the end plates 32 and 32a are provided to close the openings at the both ends of the outer tube 30 in the axial direction, as in the first embodiment previously described.

In this gas diffuser 60, since the intermediate member 40 is essentially composed of the metal wool 61, resistance to the discharged gas passing through the gas diffuser 60 can be adjusted by changing the filling density of the stainless steel threads in the space between the inner and outer tubes 20 and 30. Moreover, since the metal wool 61 is made of stainless steel, which has excellent heat resistance and corrosion resistance, durability of the metal wool 61 is improved.

Figure 5A:
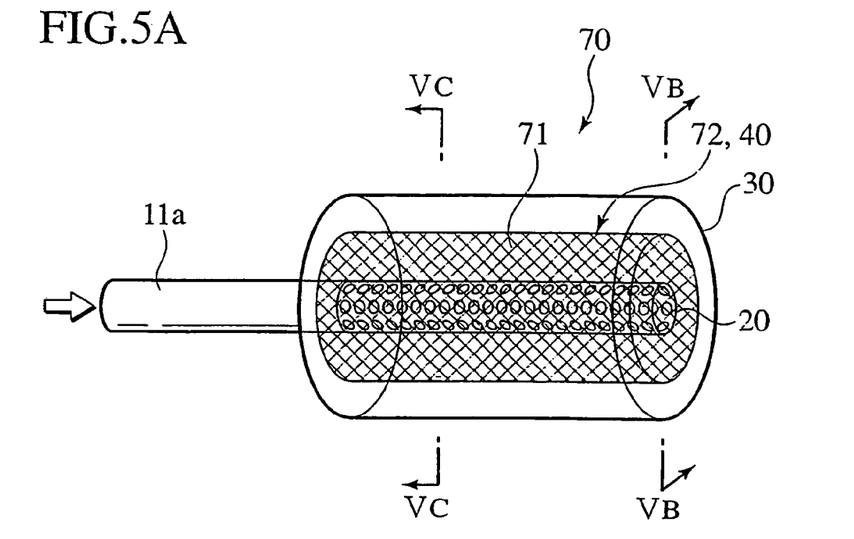
FIG. 5A is a perspective view of a third modification example of the gas diffuser for use in the excess pressure relief system of FIG. 1, from which an outer tube is omitted for clarity.
Figure 5B:
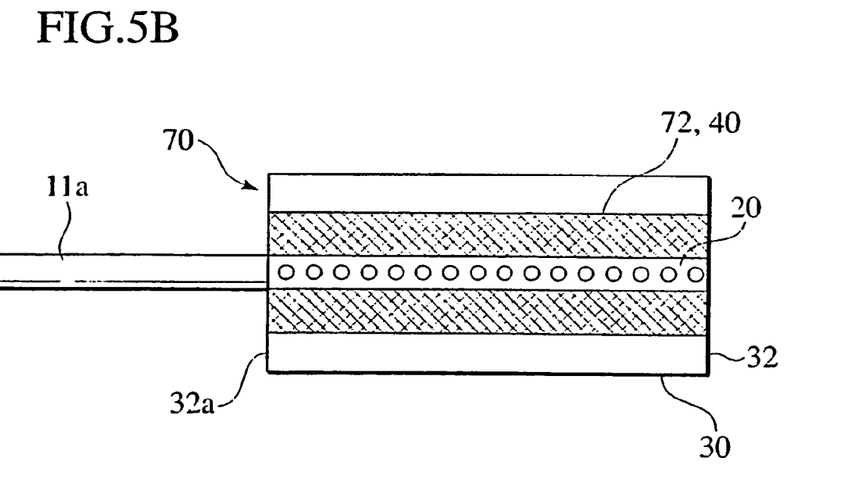
FIG. 5B is a longitudinal-sectional view of the gas diffuser of FIG. 5A, taken along a line VB—VB.
Figure 5C:
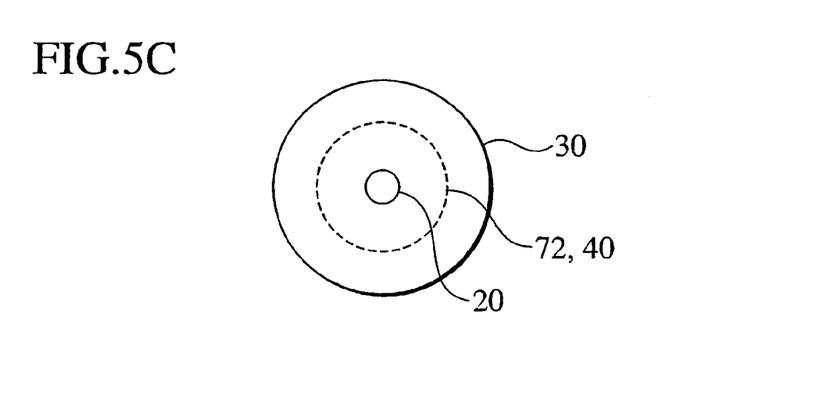
FIG. 5C is a cross-sectional view of the gas diffuser of FIG. 5A, taken along a line VC—VC.

In a gas diffuser 70 according to the third modification example, as shown in FIGS. 5A to 5C, the intermediate member 40 is essentially composed of a tubular net 72 arranged in the space between the inner and outer tubes 20 and 30 coaxially therewith. The tubular net 72 is a rolled stainless steel net 71 having a mesh size # suitable for diffusing/moderating a gas flow discharged from the inner tube 20.

Also in the third modification example, the inner tube 20 is formed to have a large number of the through holes 21 on the side face 20a thereof, and the outer tube 30 is formed to have a large number of the discharge holes 31 on the outer circumferential surface 30a thereof, respectively, and the end plates 32 and 32a are provided to close the openings at the both ends of the outer tube 30 in the axial direction, as in the first embodiment previously described.

In this gas diffuser 70, since the intermediate member 40 is essentially composed of the tubular net 72, resistance to the discharged gas passing through the gas diffuser 70 can be adjusted by changing the mesh size # of the stainless steel net 71. Moreover, since the net 71 of the tubular net 72 is made of stainless steel, which has excellent heat resistance and corrosion resistance, durability of the tubular net 72 is improved.

Figure 6:
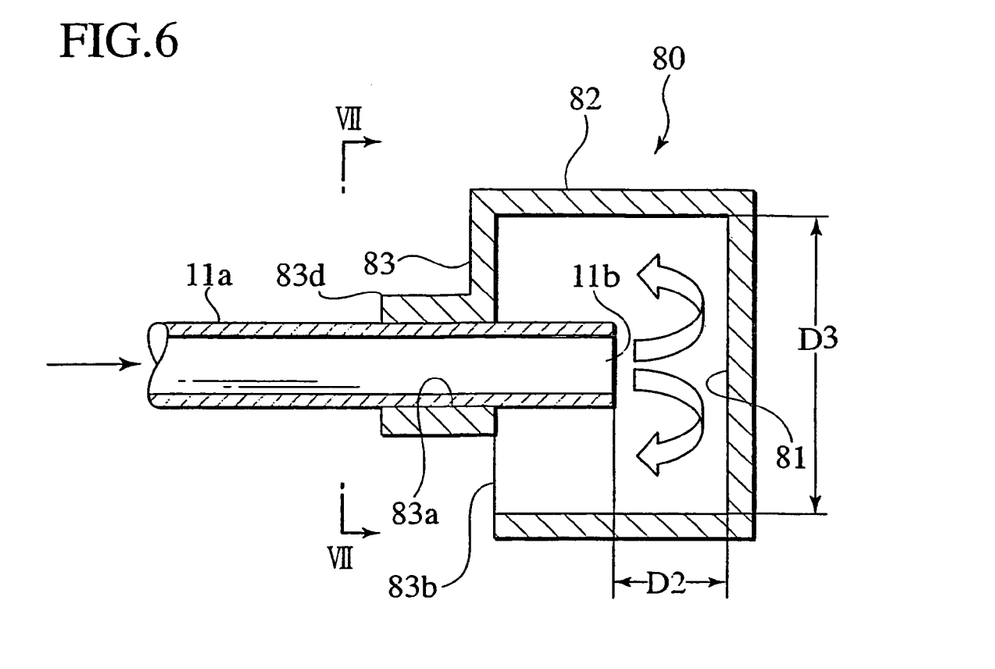
FIG. 6 is an enlarged sectional view of a gas diffuser for use in the excess pressure relief system according to a second embodiment of the present invention.
Figure 7:
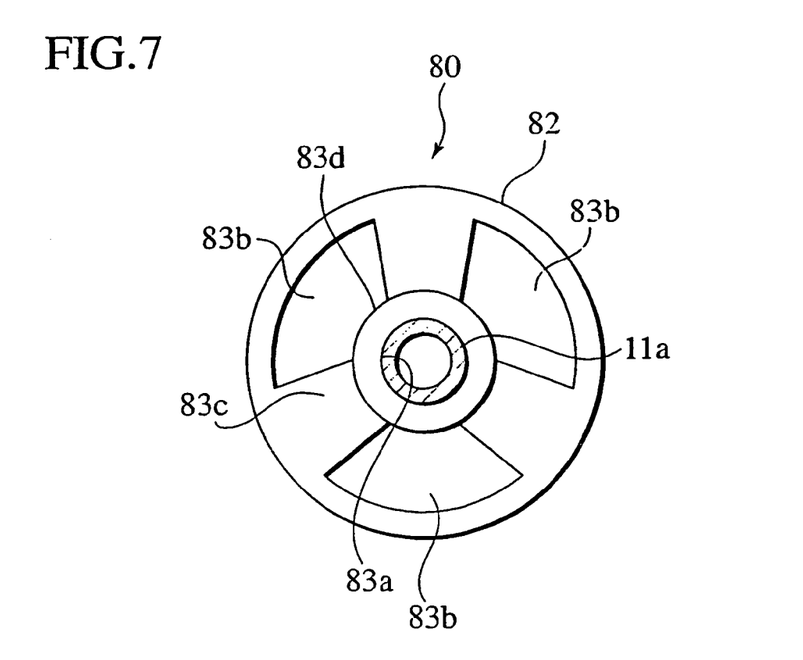
FIG. 7 is a cross-sectional view of the gas diffuser of FIG. 6, taken along a line VII—VII.

FIGS. 6 and 7 show a second embodiment of the present invention. Hereinafter, the same members in the second embodiment as those of the first embodiment are designated by the same reference characters, and explanations thereof are omitted.

A gas diffuser 80 of the second embodiment is a jet reverser including a planar reverser plate 81 which is located in front of a gas outlet 11b of the discharge line 11a downstream of the relief valve 11 (see FIG. 1) in the jet direction and perpendicular to the jet direction, and a tubular cover wall 82 extending rearward (opposite to the jet direction) from the peripheral edge of the reverser plate 81 coaxially with the gas outlet 11b and surrounding the periphery of the gas outlet 11b. A flow of gas discharged from the outlet 11b impinges on the reverser plate 81, and turns into a radial flow directed radially outward, thereby being diffused. Thereafter, the flow of the gas impinges on the inner surface of the cover wall 82, whereby the gas flow is further diffused/attenuated. Deflected by the cover wall 82, the gas flow is then converted into an axial flow directed rearward.

The gas diffuser 80 is formed into a can container shape having the reverser plate 81 as a bottom thereof, and the cover wall 82 as a side wall thereof. It also has a top plate 83 opposing the reverser plate 81 in parallel. The top plate 83 is formed to have on its central portion a hub 83d provided with an attachment hole 83a into which the discharge line 11a is inserted. Around the hub 83d, a plurality of relatively large fan-shaped openings 83b are formed on the top plate 83 at substantially equal intervals in a circumferential direction. Remainders of the top plate 83 between the openings 83*b* are radially extending supports 83*c* which connect the cover wall 82 to the hub 83*d*. The gas diffuser 80 is fixed to the discharge line 11*a* inserted into the attachment bole 83*a* of the hub 83*d*, with an appropriate space D2 left between the reverser plate 81 and the gas outlet 11*b*.

The gas flow jetted out of the gas outlet 11*b* is converted into the rearward axial flow by the reverser plate 81 and the cover wall 82, and is discharged from the fan-shaped openings 83*b*.

In an excess pressure relief system of the second embodiment, the pressure and kinetic energy of the gas flow jetted out of the gas outlet 11*b* are reduced by impinging on the reverser plate 81. The gas flow is diffused and expanded inside the cover wall 82 while being reversed by the reverser plate 81. This expansion further reduces the pressure and kinetic energy of the gas flow. Thereafter, the gas flow turns into the rear rearward flow opposite to the jet direction at the gas outlet 11*b*, and is discharged to the outside from the fan-shaped openings 83*b* of the top plate 83.

The distance from the gas outlet 11*b* to the inner surface of the reverser plate 81, and the diameter D3 of the cover wall 82 are adjusted to have the pressure and flow rate of the gas flow discharged from the relief valve 11 attenuated effectively.

Figure 8:
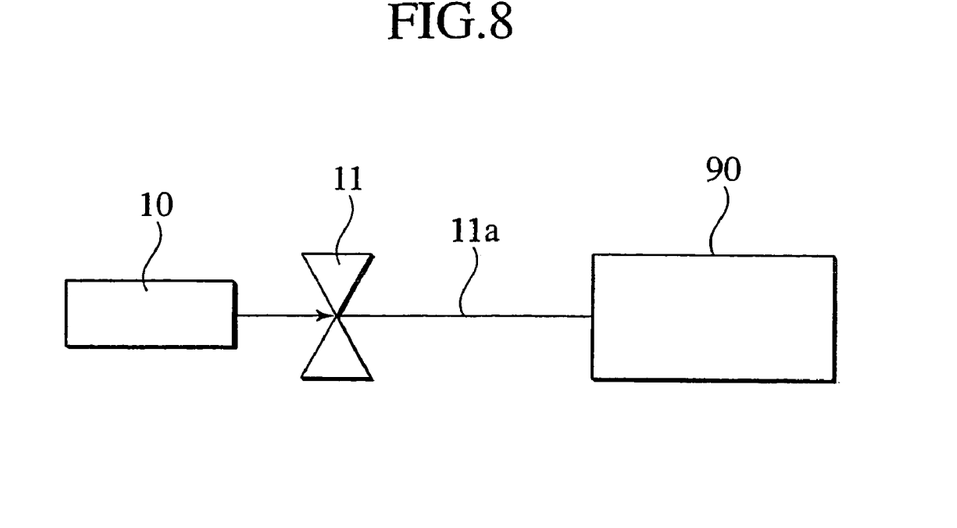
FIG. 8 is a schematic of an excess pressure relief system according to a third embodiment of the present invention.
Figure 9:
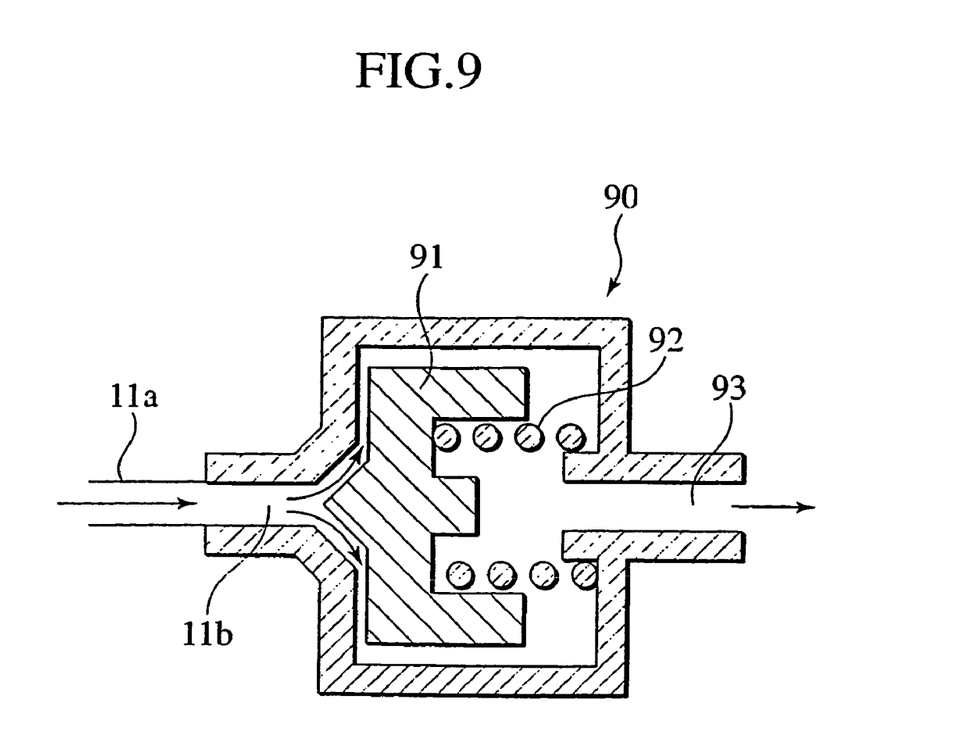
FIG. 9 is an enlarged sectional view of a control valve for use in the excess pressure relief system of FIG. 8.

FIGS. 8 and 9 show a third embodiment of the present invention. Hereinafter, the same members in the third embodiment as those of the first and second embodiments are designated by the same reference characters, and explanations thereof are omitted.

In an excess pressure relief system of the third embodiment, there is provided in the discharge line 11*a* of the relief valve 11 provided on the fuel tank 10, a control valve 90 which controls a discharge rate of gas.

As shown in FIG. 9, the control valve 90 includes a valve element 91 which opens/closes the gas outlet 11*b*, and a spring 92 which generates force to push the valve element 91 in a valve closing direction (toward the left in the drawing). The control valve 90 is opened when a pressure of the gas discharged from the relief valve 11 in the discharge line 11*a* becomes higher than a valve cracking pressure of the control valve 90, which is determined by a force of the spring 92, and then the gas is discharged from an outlet 93.

In the excess pressure relief system of the third embodiment, the valve 90 starts opening when the pressure of the gas jetted out of the relief valve 11 reaches the valve cracking pressure of the control valve 90, and gradually increases its opening, making the gas discharge rate gentle and slow. The rush of the high pressure gas discharge is thus prevented, suppressing the influence on the parts or equipment in the vicinity of the gas outlet 11*b*.

Figure 10:
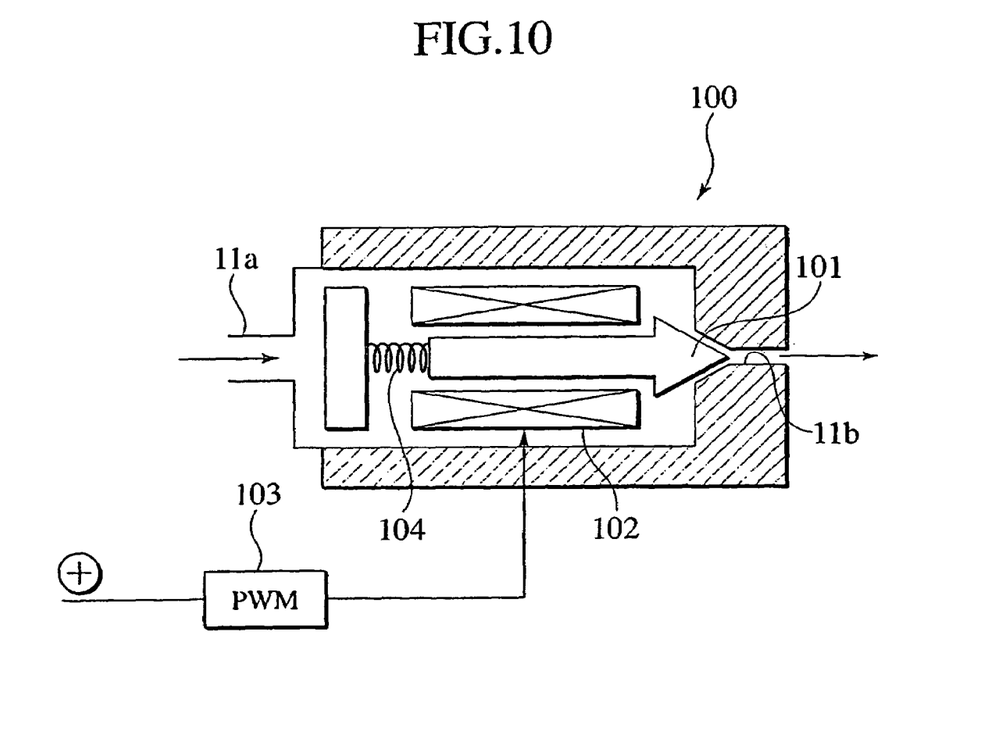
FIG. 10 is an enlarged sectional view of a control valve for use in an excess pressure relief system according to a fourth embodiment of the present invention.

FIG. 10 shows a fourth embodiment of the present invention. Hereinafter, the same members in the fourth embodiment as those of the third embodiment are designated by the same reference characters, and explanations thereof are omitted.

A control valve 100 of the fourth embodiment includes a valve element 101 which opens/closes the gas outlet 11*b*, a spring 104 which generates a force to push the valve element 101 in a valve closing direction (toward the right in the drawing), a solenoid 102 which drives this valve element 101 to open/close, and a controller 103 which sends excitation/non-excitation signals to the solenoid 102 in a controlled duty ratio.

The valve element 101 is pressed by the spring 104 in the valve closing direction, and maintained in its closed state when the solenoid 102 is not excited, and opened by the excitation of the solenoid 102. The duty ratio of the excitation/non-excitation signals to the solenoid 102 is controlled by Pulse Width Modulation (PWM) of the controller 103, and thus the discharge rate of the gas from the control valve 100 is regulated.

In an excess pressure relief system of the fourth embodiment, the controller 103 performs PWM to control the duty ratio of the excitation/non-excitation signals to the solenoid 102 depending on the monitored pressure, temperature and the like inside the fuel tank 10. Therefore, the discharge rate of the gas can be actively and precisely controlled, providing optimum attenuation of the gas flow.

Figure 11:
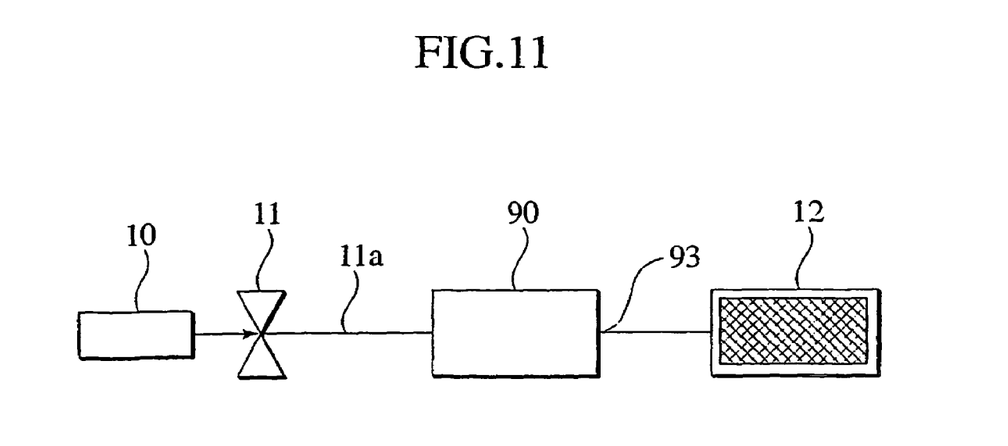
FIG. 11 is a schematic of an excess pressure relief system according to a fifth embodiment of the present invention.

FIG. 11 shows a fifth embodiment of the present invention. Hereinafter, the same members in the fifth embodiment as those of the first to third embodiments are designated by the same reference characters, and explanations thereof are omitted.

An excess pressure relief system of the fifth embodiment is provided with the control valve 90 on the discharge line 11*a* of the relief valve 11, which controls the gas discharge rate, and the gas diffuser 12 connected to the outlet 93 of the control valve 90, which attenuates and diffuses the discharged gas flow.

The control valve 90 and the gas diffuser 12 have the same configurations as those of the third and first embodiments, respectively.

The excess pressure relief system of the fifth embodiment is provided with an integrated function of those of the control valve 90, which enhances the attenuation efficiency of the discharged gas flow, and the gas diffuser 12, which further diffuses the attenuated gas flow, efficiently preventing the influence on the parts or equipment close in front of the relief valve 11 in the jet direction.

Moreover, in this embodiment, the control valve 100 of the fourth embodiment can be used in place of the control valve 90 of the third embodiment. Further, in place of the gas diffuser 12 of the first embodiment, the gas diffuser 50, 60 or 70 described in the first to third modification examples or the gas diffuser 80 of the second embodiment can be used.

The present disclosure relates to subject matter contained in Japanese Patent Application No. 2002-297212, filed on Oct. 10, 2002, the disclosure of which is expressly incorporated herein by reference in its entirety.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

INDUSTRIAL APPLICABILITY

As described above, according to the excess pressure relief system for a tank of the present invention, the relief valve 11, which discharges gas in the tank 10, is provided on the tank 10 such as a fuel tank or a hydrogen tank, and the gas diffuser 12 is provided in the discharge line 11*a* of the relief valve 11. Accordingly, a flow of gas jetting from the relief valve 11 can be attenuated, thus making it possible to prevent the discharged gas from affecting the parts or equipment in the vicinity of the relief valve 11.

The invention claimed is:

1. An excess pressure relief system for a tank carried on a vehicle, comprising:
    a relief valve for relieving excess pressure in the tank;
    a control valve for controlling gas discharge rate, provided on a discharge line downstream of the relief valve; and
    a diffuser provided downstream of the control valve.

2. The excess pressure relief system according to claim 1, wherein the diffuser comprises:
    an inner perforated member connected to the discharge line,
    an outer perforated member surrounding the inner member, and
    an intermediate diffuser member arranged in a space between the inner and outer perforated members.

3. The excess pressure relief system according to claim 2, wherein
    the diffuser member is made of a perforated plate having holes of predetermined sizes.

4. The excess pressure relief system according to claim 2, wherein
    the diffuser member comprises a mass of unwoven metal threads.

5. The excess pressure relief system according to claim 2, wherein
    the diffuser member is made of a net of a predetermined mesh size.

6. The excess pressure relief system according to claim 1, wherein the diffuser comprises:
    a deflector for deflecting gas flow discharged from the relief valve, the deflector having a planer wall portion on which the discharged gas flow impinges and a tubular wall portion for turning the direction of the gas flow.

7. The excess pressure relief system according to claim 1, wherein the control valve comprises:
    a valve element which opens/closes an outlet of the relief valve, and
    a resilient member which generates force to close the valve element.

8. The excess pressure relief system according to claim 1, wherein the control valve comprises:
    a valve element which opens/closes an outlet of the relief valve,
    a solenoid to drive the valve element, and
    a controller for controlling duty ratio of the solenoid.

* * * * *